(12) United States Patent
Tate et al.

(10) Patent No.: US 10,147,070 B1
(45) Date of Patent: Dec. 4, 2018

(54) MODULAR PROCESS INDICATION LIGHTING WITH INPUT DEVICES

(71) Applicant: Amazon Technologies, Inc., Seattle, WA (US)

(72) Inventors: Keith C. Tate, Middletown, DE (US); Steven Scott Altvater, Elkton, MD (US); Jaemi Cheri Tiangco Bermudez, Des Moines, WA (US); Kevin W. Keck, Seattle, WA (US); Benjamin Christopher Zink, Mechanicsburg, PA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/967,895

(22) Filed: May 1, 2018

(51) Int. Cl.
| | |
|---|---|
| *B65G 65/00* | (2006.01) |
| *G06Q 10/08* | (2012.01) |
| *G01V 8/20* | (2006.01) |
| *H05B 33/08* | (2006.01) |
| *B65G 1/16* | (2006.01) |

(52) U.S. Cl.
CPC .............. *G06Q 10/087* (2013.01); *G01V 8/20* (2013.01); *H05B 33/0845* (2013.01); *B65G 1/16* (2013.01); *B65G 65/005* (2013.01)

(58) Field of Classification Search
CPC ................................ B65G 65/005; B65G 1/16
USPC ................................................... 414/273, 274
See application file for complete search history.

(56) References Cited

U.S. PATENT DOCUMENTS

| | | | | |
|---|---|---|---|---|
| 3,526,326 | A * | 9/1970 | Castaldi | B65G 1/0435 414/273 |
| 4,955,784 | A * | 9/1990 | Staszewski | B65G 59/026 198/414 |
| 2008/0181753 | A1* | 7/2008 | Bastian | B65G 1/026 414/277 |

* cited by examiner

*Primary Examiner* — Thuy Vinh Tran
(74) *Attorney, Agent, or Firm* — Patterson + Sheridan, LLP

(57) ABSTRACT

Embodiments herein describe a configurable lighting system that can be used to redefine the size of the storage areas holding items. When changing the dimensions of the storage areas, an associate may also want to change the assignment of lights disposed near the storage areas. To do so, the configurable lighting system includes a series of lights disposed along a first axis and a set of confirmation devices corresponding to the series of lights. The lighting system can receiving first and second input signals from the set of confirmation devices and identify a first subset of the series of lights corresponding to the first input signal and a second subset of the series of lights corresponding to the second input signal. The first and second subsets can define respective lengths of first and second storage areas when illuminated.

20 Claims, 10 Drawing Sheets

MODULAR PROCESS INDICATION LIGHTING WITH INPUT DEVICES

BACKGROUND

Shipping packages typically involves moving the packages to different locations in a shipping warehouse in preparation for the packages being loaded onto trucks. Although some of the package movement throughout the warehouse can be automated, much of the sorting is performed by humans. For example, an item sortation machine may sort packages into different bins or containers but a worker (also referred to as an associate) in the warehouse retrieves those containers to build a pallet, place the container on a conveyor, move the container onto a forklift, and the like.

BRIEF DESCRIPTION OF DRAWINGS

Various embodiments in accordance with the present disclosure will be described with reference to the drawings, where like designations denote like elements.

DETAILED DESCRIPTION

Figure 1:
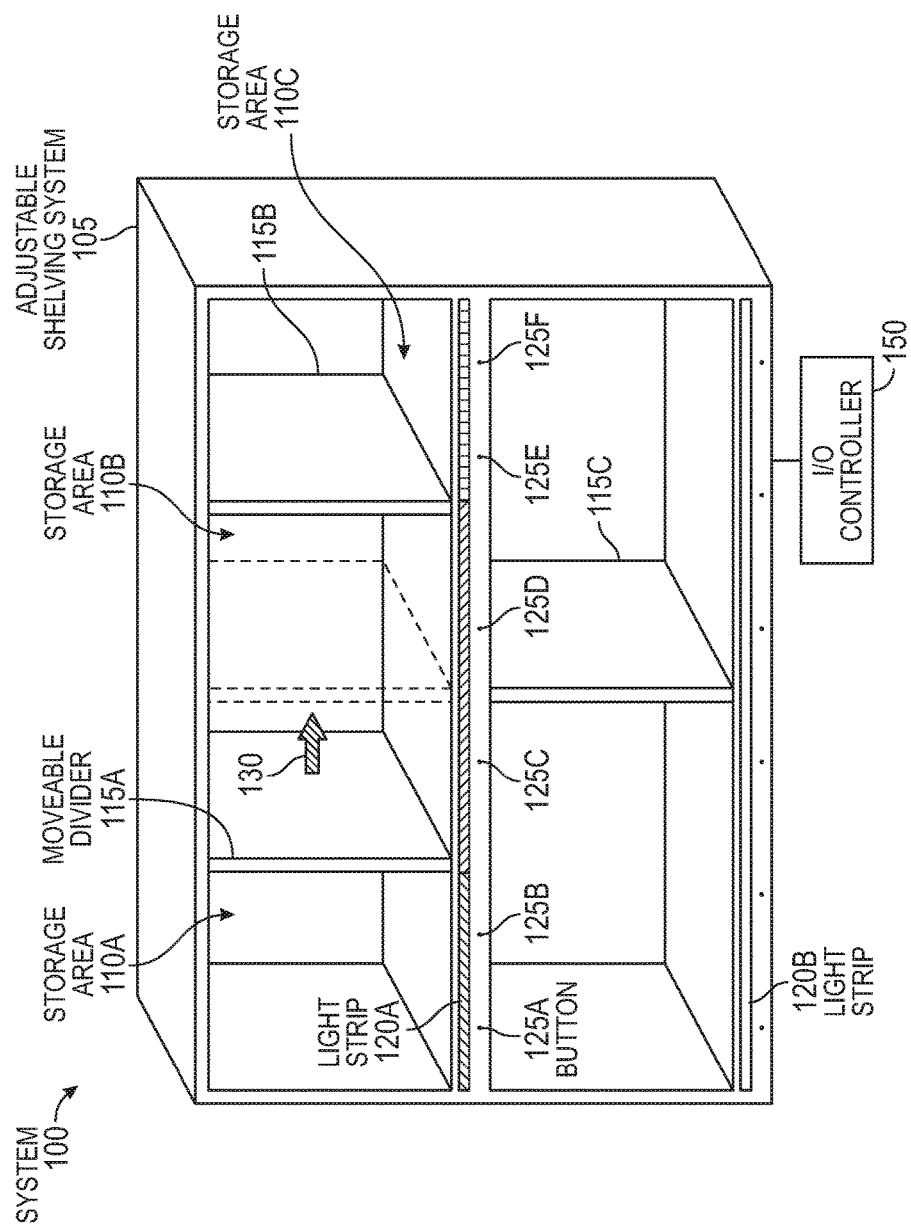
FIG. 1 is an adjustable shelving system with a configurable lighting system, according to various embodiments.

An associate in a shipping center can move items into, and out of, various storage areas. To assist the associate when identifying a storage area corresponding to an item, lights can be disposed next to each of the storage areas. For example, the lights next to the storage area can illuminate indicating to the associate that the storage area contains an item the associate is searching for. In another example, the lights next to the storage area can illuminate indicating that the associate should place an item she is sorting into the storage area. In this manner, the lights provide an efficient mechanism for communicating with the associate where to retrieve—i.e., pick—an item or store—i.e., stow—an item.

Embodiments herein describe a configurable lighting system that can be used to redefine the size of the storage areas holding the items. For example, an adjustable shelving system can include moveable dividers for altering the storage areas formed by the dividers. To help associates when picking or stowing items in these storage areas, a light strip may extend below each shelf. The light strip may include a plurality of individual lights (e.g., light emitting diodes (LEDs)) that indicate where one storage area ends and the other begins. For example, a shelf may be divided into two storage areas by a moveable divider. A first subset of the lights in the strip may correspond to the first storage area while the remaining lights (i.e., a second subset of the lights) in the strip correspond to the second storage area. By illuminating one of these subsets, the associate can readily identify the storage area where she should stow or pick an item. However, if the divider is moved, thereby changing the dimensions of the two storage areas, some of the lights in the first subset may now be disposed under the second storage area or some of the lights in the second subset are disposed under the first storage area. Adjusting the lights on some lighting systems may require a person with specialized knowledge to recalibrate the lights so they are assigned to different storage areas. This can be a time consuming and expensive process.

The configurable lighting system described herein can be adjusted quickly and without requiring a person with specialized knowledge of the hardware or internal addressing of the lighting system. The lighting system includes an input/output (I/O) controller and a display device that permits an associate to indicate lights that she wants to reconfigure in response to, for example, moving a divider in an adjustable shelving system. The I/O controller is also coupled to confirmation devices (e.g., buttons, light curtains, light detectors, capacitive sensors, motion detectors, and the like) which are co-located with the lights. For example, a light strip may be disposed in the same direction as the confirmation devices which extends below the bottom of a shelf. Put differently, the light strip and the confirmation devices may disposed on separate, but parallel, axes. When the associate activates one of the confirmation devices (e.g., a button), a subset of the lights on the strip may illuminate. The associate can keep pressing more buttons in sequence, which illuminates more and more of the lights on the strip, until reaching the divider. To indicate she has reached the divider, and thus, the end of the first storage area, the associate can press the last button twice indicating to the I/O controller the length of the first storage area. The associate can then press the next button which illuminates more lights (but in a different color) to assign these lights to a second storage area. The associate can continue to press more of the buttons until reaching the end of the second storage area (e.g., the end of the shelf or another divider). In this manner, the associate can quickly associate a subset of the lights in the strip to a storage area in the shelf.

Moreover, after using the confirmation devices to configure the lights in the light strip to reflect the size of the storage area, the confirmation devices can then be used when picking items from, or stowing items into, the storage areas. For example, if the associate is picking an item from the storage area (which is illuminated by a corresponding subset of the lights), after (or when) retrieving the item she can activate one of the confirmation devices corresponding to the illuminated lights by, e.g., pressing a button, touching a pressure transducer, breaking a light curtain, and the like. This indicates to an inventory tracking system that an item has been taken from the storage area. In this manner, the confirmation devices can be dual purposed to both to reprogram the lights as the sizes of the storage areas change and to confirm user interaction with the storage area when picking or stowing items.

FIG. 1 is an adjustable shelving system 105 with a configurable lighting system, according to various embodiments. That is, FIG. 1 illustrates a system 100 that includes the adjustable shelving system 105 on which are mounted light strips 120 and buttons 125 that are communicatively coupled to an I/O controller 150. In one embodiment, the light strips 120, buttons 125, and the I/O controller 150 form the configurable lighting system.

The shelving system 105 includes two shelves—an upper shelf and a lower shelf—which are divided into different storage areas 110 using moveable dividers 115. In this example, the upper shelf includes two moveable dividers 115 which form three storage areas 110A, 110B, and 110C. That is, the length of the storage area 110A (i.e., the horizontal direction) extends from the left end of the upper shelf to the divider 115A, the length of the storage area 110B extends from the divider 115A to the divider 115B, and the length of the storage area 110C extends from the divider 115B to the right end of the upper shelf.

As mentioned above, the dividers 115 are moveable which may be advantageous when different shaped items are stowed in the storage areas 110. For example, the adjustable shelving system 105 may be used in a shipping warehouse or facility where packages are sorted into the storage areas 110. Because the storage areas 110 may be transient locations for the packages (e.g., the packages are stored in the shelves temporary before being moved to more permanent locations or before being shipped out of the facility), the type of packages stowed in the adjustable shelving system 105 may vary on a day-to-day basis. If an associate knows that a lot of large packages or items will be stored in the system 105 that day, the manager can move the dividers 115 to generate larger storage areas for accommodating the larger items. For example, the arrow 130 illustrates moving the divider 115A from a previous location (illustrated by the ghosted lines) to a new location. Doing so increases the size of the storage area 110A at the expense of the storage area 110B. Thus, the storage area 110A may be assigned to stow larger items while the storage area 110B stows smaller items.

In one embodiment, the dividers 115 can be mounted on tracks or rails so they can be moved to change the size of the storage areas 110. In another embodiment, the dividers 115 may be inserted into predefined slots on the top and bottom of each shelf. To move the dividers 115, an associate may first pull the divider out from its current slot and then insert the divider 115 into a new slot at a different location along the shelf. Additionally or alternatively, the shelves may move in a vertical direction to alter the size of the storage areas 110. For example, the middle surface (on which the light strip 120 and buttons 125 are mounted) that divides the upper and lower shelves may be track mounted to the sides of the system 105 so that this surface can be raised or lowered. In this example, the dividers 115 may not extend to the top of the shelf to provide room from adjusting the middle surface.

The hashing in the light strip 120A indicates which portion of the strip 120A is assigned to the storage area 110A, which portion is assigned to the storage area 110B, and which portion is assigned to the storage area 110C. That is, the left slanted hashing indicates a portion of the light strip 120A which has lights that are illuminated when an item should be stowed or picked from the storage area 110A, the right slanted hashing indicates a portion of the light strip 120A which contains lights that are illuminated when an item should be stowed or picked from the storage area 110B, and the vertical slanted hashing indicates a portion of the light strip 120A which contains lights that are illuminated when an item should be stowed or picked from the storage area 110C. For example, portions of the light strips 120 under the storage areas 110A-110C may include a series of lights disposed at predefined intervals—e.g., one LED every one inch—along a common axis. Thus, each portion of the light strip 120 may include any number of individual lights sources.

However, these portions are misaligned after the divider 115A is moved. That is, by moving the divider 115A to the right as shown, some of the lights in the right slanted hashing of the light strip 120A (which are assigned to the storage area 110B) are now underneath the storage area 110A. If the light assignments remain unchanged, when illuminating the lights for the storage area 110B, some of those lights would be to the left of the movable divider 115A, and thus, an associate may be confused whether the area to the left of the divider 115A or to the right of the divider 115A is the intended storage area for the item. Stated differently, if the configuration of the light strip 120A is not updated in response to moving the divider 115A, then some of the right slanted hashing is to the left of the divider 115A (which is now part of the storage area 110A). This can confuse an associate since the lights in the strip 120A above the buttons 125C and 125D are beneath two different storage areas.

In the embodiments herein, the configurable light system is updated to reflect changes in the storage areas 110. That is, as the dividers 115 are moved, the I/O controller 150 changes the assignment of the lights in the light strips 120 as well as the buttons 125 to a particular storage area 110. For example, using user input, the I/O controller 150 can reassign the lights in the light strip 120A above the button 125C from the storage area 110B to the storage area 110A. Thus, when indicating to an associate that she should stow an item in, or retrieve an item from, the storage area 110A, the I/O controller 150 can light up the lights above the buttons 125A, 125B, and 125C. When indicating to an associate that she should stow an item in, or retrieve an item from, the storage area 110B, the I/O controller 150 can light up the lights above the button 125D. When indicating to an associate that she should stow an item in, or retrieve an item from, the storage area 110C, the I/O controller 150 can light up the lights above the buttons 125E and 125F. In this manner, the lights in the light strips 120 and the buttons 125 can be reassigned as the dimensions of the storage areas 110 change.

In other embodiments, the adjustable shelving system 105 can include light strips that extend vertically along its sides. If, for example, the middle surface is raised on lowered, the I/O controller 150 updates the assignment of the lights to reflect the change in the vertical dimensions of the upper and lower shelves.

Figure 2:
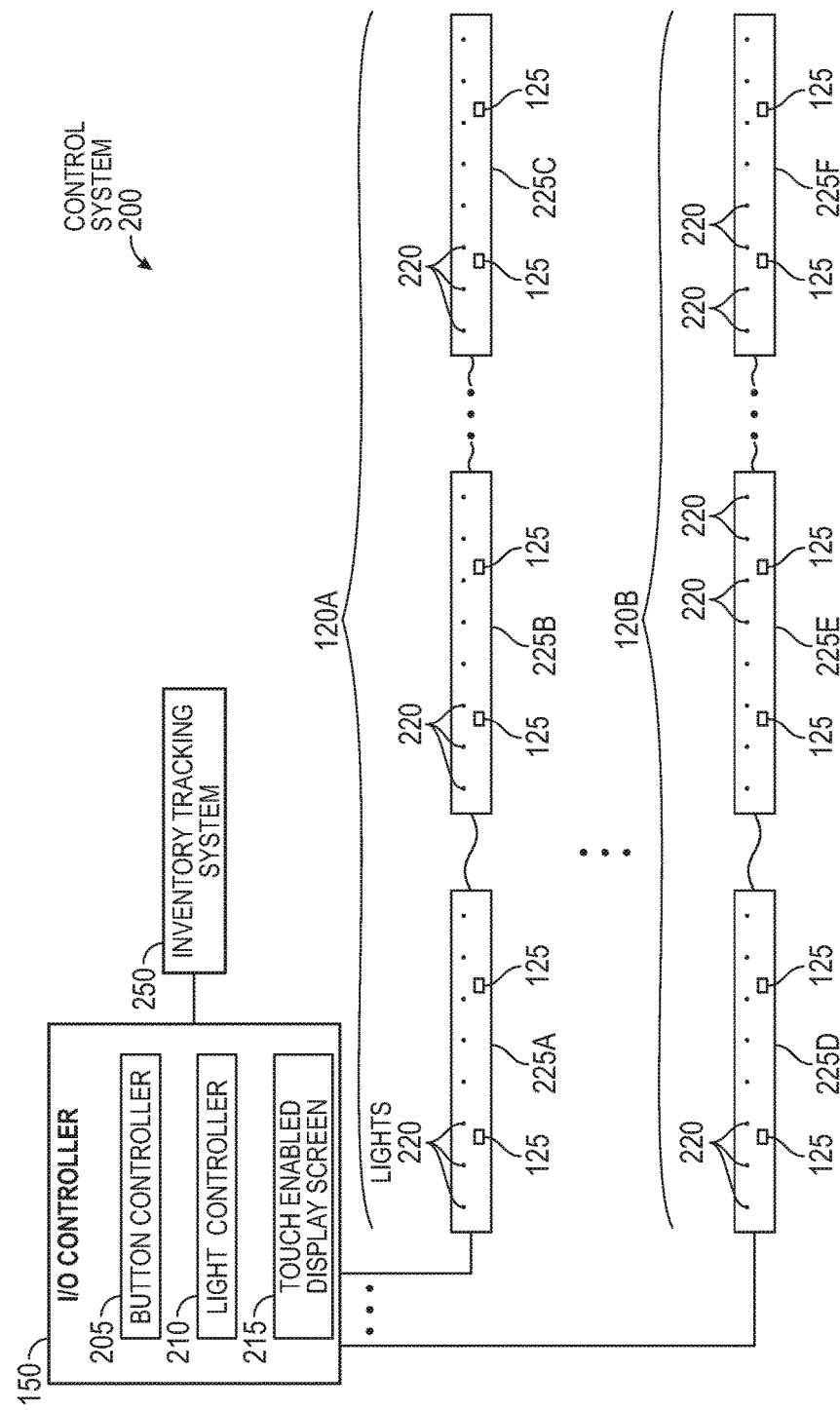
FIG. 2 illustrates a configurable lighting system, according to various embodiments.

FIG. 2 illustrates a configurable lighting system, according to various embodiments. As shown, FIG. 2 includes a control system 200 with the I/O controller 150 that is communicatively coupled to the lights strips 120A and 120B. In one embodiment, the I/O controller 150 includes a plurality of ports that can be coupled to the light strips 120.

As shown, the lights strips 120 are composed from modular light assemblies 225 which can be daisy chained or coupled in series. For example, each of the modular light assemblies 225 may have a fixed length of twelve inches. Thus, for a shelf that is eight feet long, eight of the modular light assemblies 225 can be daisy chained to extend underneath (or above) the shelf. However, a shelf may be only four feet long in which case four of the individual light assemblies 225 are daisy chained. Thus, using the modular light assemblies 225 permits the length of the strips 120 to be adjusted to better match the lengths of the shelves. In one embodiment, the modular light assemblies 225 are coupled using a cable (or cables) that permit digital data to be transmitted.

The modular light assemblies 225 each includes a series of individual lights 220 (e.g., LEDs or other type of lights) and integrated buttons 125. For example, the assemblies 225 can include a body in which both the lights 220 and the integrated buttons 125 are mounted to establish fixed spatial relationships. However, in other embodiments, the lights 220 and the buttons 125 may not be integrated into the same body. For example, the lights 220 and buttons 125 may have separate communication paths to the I/O controller 150 rather than using the same communication path provided by the modular light assemblies 225 as shown here.

In one embodiment, the lights 220 are programmable lights that can output different colors. For example, the I/O controller 150 may transmit a data signal indicating the current color to be emitted by the lights 220. In one embodiment, the I/O controller 150 may change the color assigned to the lights 220 when the lights are assigned to different storage areas. In one embodiment, the lights 220 and buttons 125 have unique addresses. Although not shown, each of the modular light assemblies 225 can include a microcontroller that communicates with the I/O controller 150 to assign unique addresses to the lights 220 (or a group of lights) and the buttons 125. In this manner, the I/O controller 150 can transmit instructions to the lights 220 to control their color as well as receive user input via the buttons 125.

The I/O controller 150 includes a button controller 205, a light controller 210, and a touch enabled display screen 215. The button controller 205 communicates with the buttons 125 in the light strips 120 to detect user interaction (e.g., identifying a button pressed by the user). The button controller 205 can identify which button 125 a user pressed and the location of that button 125 on the strips 120. In one embodiment, the button controller 205 stores an assignment of the button 125 to a particular storage area. That way, if the user presses the button 125 to indicate she has taken an action at the assigned storage area (e.g., stowing an item in, or picking an item from, the storage area), the button controller 205 can inform an inventory tracking system 250 of the user action and in which storage area the action was performed.

The light controller 210 communicates with the lights 220 in the light strips 120 to indicate to a user where she should perform an action. That is, the user may scan a barcode on a package that is received by the inventory tracking system 250 which in turn identifies which storage area the user should stow the package. The inventory tracking system 250 can instruct the light controller 210 to illuminate the storage area for the associate. Like the button controller 205, the light controller 210 can store a table that assigns the lights 220 to a storage area. Using this table, the light controller 210 identifies the lights 220 assigned to the storage area indicated by the inventory tracking system 250 and illuminates those lights. Moreover, as described in more detail below, the button controller 205 and the light controller 210 can reconfigure the assignments of the buttons 125 and the lights 220 when the dimensions of the storage areas change.

The touch enabled display screen 215 permits an associate to indicate when she desires to reconfigure the lighting system—e.g., assign the lights 220 and buttons 125 to different storage areas. For example, an associate can use the display screen 215 to indicate which of the light strips 120 she wishes to reconfigure. The I/O controller 150 can then start a reconfiguration protocol that uses the buttons 125 to receive user input for reconfiguring the lights 220 and the buttons 125—e.g., reassigning one or more of the lights 220 and buttons 125 to different storage areas.

Figure 3:
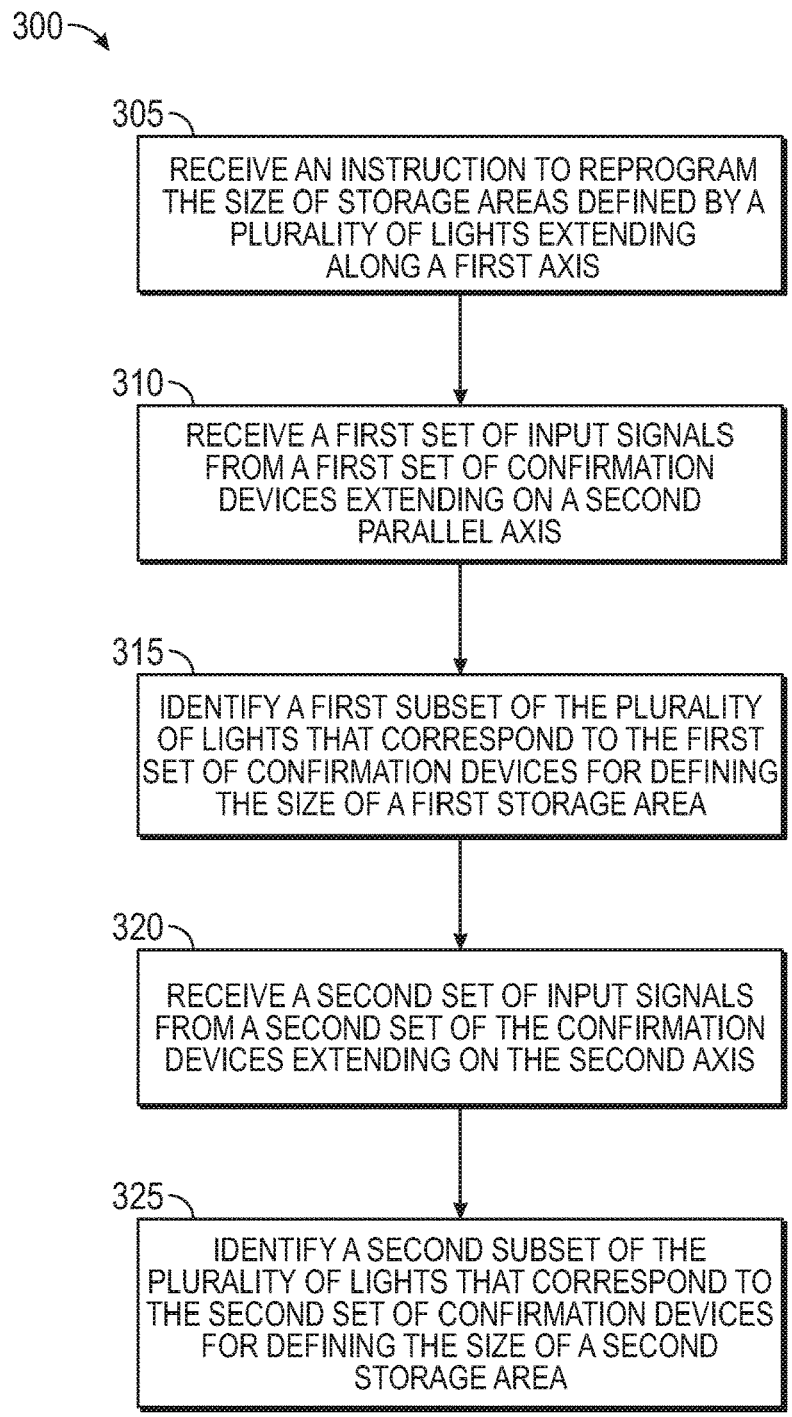
FIG. 3 is a flowchart for configuring a lighting system for defining storage areas, according to various embodiments.

FIG. 3 is a flowchart of a method 300 for configuring a lighting system for defining storage areas, according to various embodiments. At block 305, the touch enabled display screen in the I/O controller receives an instruction to reprogram the size of storage areas defined by a plurality of lights extending along a first axis. That is, an associate may have reconfigured the storage areas in a shelf by physically moving one or more dividers. As shown in FIG. 1, the light strips 120 extend in a horizontal direction (or horizontal axis) along the bottom of the upper and lower shelves. Because of the change in the size of the storage areas 110, the associate may want to reprogram the lights to better match or reflect the updated sizes of the storage areas 110.

In one embodiment, the method 300 is used to initially program the size of the storage areas using the light strips. That is, the method 300 can be used to both program the lights for the first time to define the size or length of the storage areas, as well as reprogram the lights when the lengths of the storage areas change.

At block 310, the button controller in the I/O controller receives a first set of input signals from a first set of confirmation devices extending on a second axis parallel to the first axis. The confirmation devices can be physical buttons that are pressed by the user (e.g., the buttons 125 illustrated in FIGS. 1 and 2), capacitive sensing buttons, a motion detector, an optical sensor (e.g., a photo-eye detector), a transducer, and the like. A set of confirmation devices can include only one confirmation device (e.g., a transducer or light curtain that extends along the entire length of the shelf) or a plurality of discrete confirmation devices (e.g., a plurality of buttons or motion detectors). The confirmation devices can be any I/O sensor that permits the button controller to detect human interaction with the storage area such as reaching into the storage area, standing in front of the storage area, retrieving an item in the storage area and the like. In one embodiment, the user makes a conscious effort (or separate action) to interact with the confirmation device, such as pressing a physical or capacitive button. In another embodiment, the user interacts (or activates) the confirmation device as part of performing the action in the storage area such as retrieving or stowing an item. For example, if the confirmation device is a light sensor or motion detector, the confirmation device can detect the motion used by the associate to retrieve or stow an item in the storage area.

The first set of input signals includes signals from at least one of the confirmation devices but can include signals from two or more confirmation devices. For example, the first set of signals may include an associate pressing a single button of a plurality of buttons that extend along a parallel axis as the plurality of lights (e.g., a light strip). The first set of input signals can include an associate pressing a plurality of buttons sequentially starting from the leftmost button and heading towards the rightmost button (assuming the buttons extend along a horizontal axis).

At block 315, the light controller identifies a first subset of the plurality of lights that corresponds to the first set of confirmation devices for defining the size of the first storage area. In this embodiment, each of the confirmation devices is associated with, or corresponds to, one or more of the lights—e.g., a subset of the lights. Referring to FIG. 2, each of the buttons 125 may correspond to four of the lights 220. For example, in the modular light assembly 225A, the four leftmost lights 220 may correspond to the left button 125 while the four rightmost lights 220 correspond to the right button 125. Thus, if the associate presses the left button 125, the light controller 210 activates the four leftmost lights 220. Depending on the buttons (e.g., confirmation devices) selected by the associate, the light controller can identify the plurality of lights which reflect or define the size of the first storage area. Put differently, using the confirmation devices, the associate can select which of the lights are underneath the first storage area. Moreover, the button controller can also identify which buttons are assigned to first storage area.

Figure 4A:
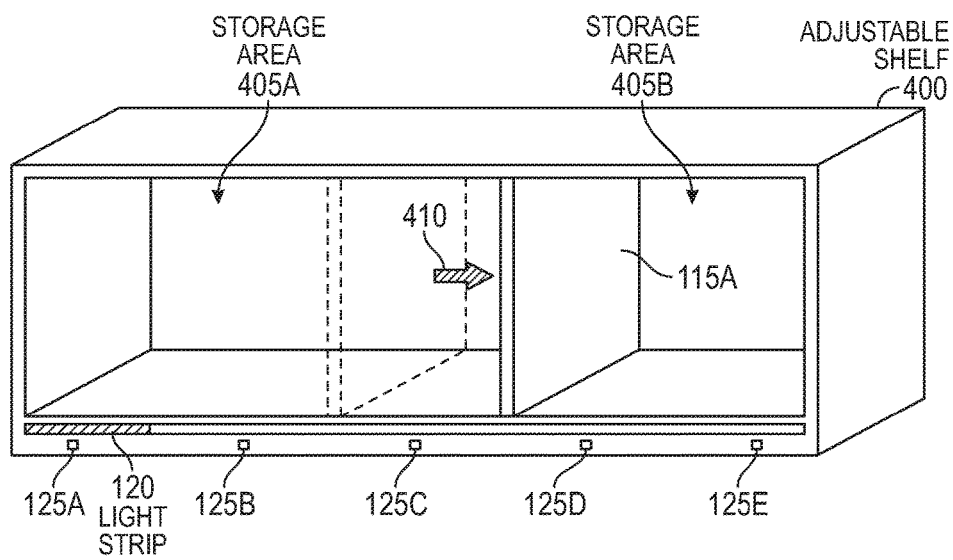
FIGS. 4A-4D illustrate reconfiguring a lighting system for an adjustable shelf, according to various embodiments.
Figure 4B:
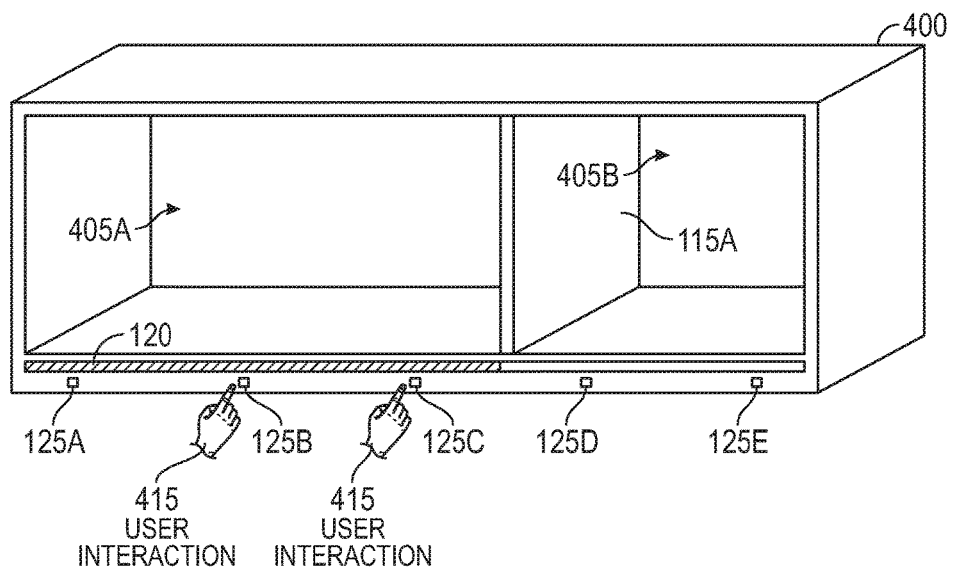

FIGS. 4A-4D illustrate reconfiguring a lighting system for an adjustable shelf, according to various embodiments. Specifically, FIGS. 4A and 4B illustrate an example of performing blocks 310 and 315 where an associate provides a first set of input signals that the light controller uses to identify a first subset of the plurality of lights that defines the size of a first storage area—e.g., storage area 405A.

In FIG. 4A, the light controller illuminates a first portion of lights in the light strip 120 that correspond to the button 125A. In one embodiment, FIG. 4A represents a state of an adjustable shelf 400 when an associate has indicated to the I/O controller at block 305 of method 300 that she wants to reprogram the size of the storage areas as defined by the plurality of lights in the light strip 120. In response, the light controller illuminates the portion of the light strip 120 above the button 125A to indicate to the associate the I/O controller is ready to reprogram the adjustable shelf 400.

In one embodiment, the associate reprograms the light strip 120 in response to moving the divider 115A as shown by the arrow 410 to a different location, thereby changing the sizes (i.e., the lengths) of the storage areas 405A and 405B. Specifically, the arrow 410 indicates increasing the size of the storage area 405A by reducing the size of the storage area 405B. Before moving the divider 115A, because the divider 115A was between the button 125B and the button 125C, the lighting system was configured such that the lights in the strip 120 corresponding to the buttons 125A and 125B were assigned to the storage area 405A—i.e., these lights defined the length of the storage area 405A—while the lights corresponding to the buttons 125C, 125D, and 125E were assigned to the storage area 405B—i.e., these lights defined the length of the storage area 405B. After moving the divider 115A, however, the associate may wish to reprogram the lights in the strip 120 and the buttons 125 such that the lights in the strip 120 corresponding to the button 125C are now assigned to the storage area 405A using the method 300.

FIG. 4B illustrates user interactions 415 generating a first set of input signals from a first set of confirmation devices (i.e., the buttons 125B and 125C). In one embodiment, the associate first interacts with the button 125B which causes the lights corresponding to the button 125B in the strip 120 to illuminate as indicated by the hashing. Later, the associate then interacts with the button 125C which causes the lights corresponding to this button to also illuminate as shown by the hashing. In this example, the user presses the buttons 125 sequentially until she reaches the divider 115A which defines the end of the storage area 405A. By doing so, the associate indicates a first subset of the lights in the strip 120 which define a size of the storage area 405A (e.g., its length).

In one embodiment, the associate may perform a special action to indicate to the I/O controller that she has reached an end of the storage area 405A. For example, the associate may press the last button in the storage area 405A—e.g., the button 125C—to indicate she has reached a divider (or the beginning of another storage area). This informs the I/O controller that the illuminated lights shown by the hashing reflect the length of the storage area 405A. In response, the light controller may update a database or data structure to indicate that the lights corresponding to the buttons 125A-125C are now assigned to the storage area 405A.

In one embodiment, instead of the associate pressing the buttons sequentially, she may press only the last button in the storage area. That is, instead of pressing the button 125B before pressing the button 125C, the associate may press only the last button 125C which illuminates all the lights between the initially illuminated lights (e.g., the lights above the button 125A) and the last button (e.g., the button 125C).

Returning to the method 300, at block 320 the button controller receives a second set of input signals from a second set of confirmation devices extending on the second axis. That is, the second set of confirmation devices extends along the same axis as the first set of confirmation devices.

At block 325, the light controller identifies a second subset of the plurality of lights that corresponds to the second set of confirmation devices for defining the size of a second storage area. As above, each of the confirmation devices is associated with, or corresponds to, one or more of the lights in the plurality of lights such as a set number of lights in the same light strip. Thus, depending on the buttons (or confirmation devices) selected by the associate, the light controller can identify the plurality of lights which reflects or defines the size of the second storage area. Put differently, using the confirmation devices, the associate can select which of the lights are underneath the second storage area. Moreover, the button controller can also identify which buttons are assigned to the second storage area.

Figure 4C:
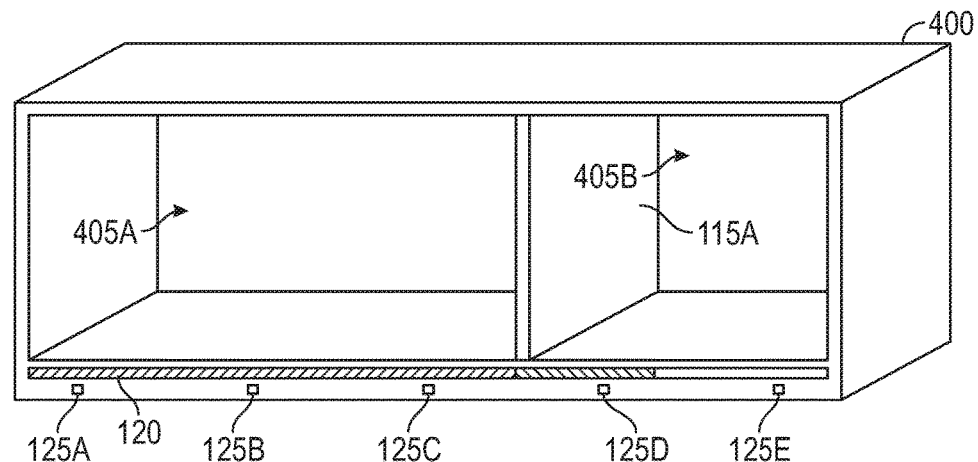
Figure 4D:
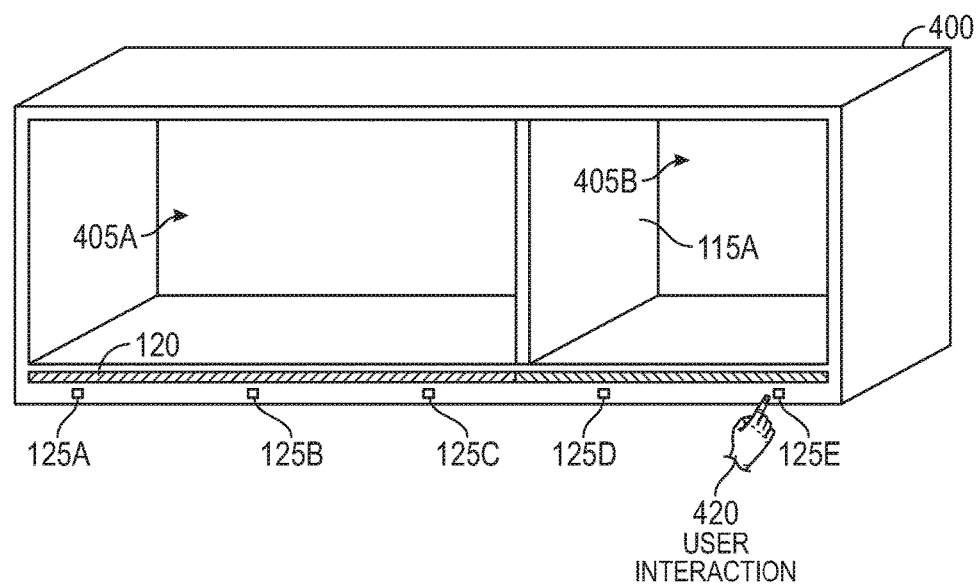

FIGS. 4C and 4D illustrate an example (continuing from the example shown in FIGS. 4A and 4B) where an associate can provide a second set of input signals which the light controller uses to identify a second subset of the plurality of lights that defines the size of a second storage area—e.g., storage area 405B. FIG. 4C illustrates a point in time after FIG. 4B where the associate has performed the user interactions 415 to identify the lights assigned to the first storage area 405A. For example, after the user has pressed the last button 125C in the first storage area 405A twice, the I/O controller may automatically illuminate the lights in the strip 120 assigned to the button 125D (e.g., the next button in the sequence of buttons). However, the lights above the button 125D may be illuminated in a different color than the lights above the buttons 125A-125C as indicated by the different hashing. Thus, the associate can easily distinguish between where the storage area 405A ends and where the storage area 405B begins (e.g., the location of the divider 115A).

In one embodiment, the I/O controller may turn off the lights above the buttons 125A-125C when beginning to define a new storage area 405. That is, when illuminating the lights above the button 125D, the controller may turn off the lights above the buttons 125A-125C, in which case the lights above the button 125D can be the same color as used when illuminating the lights corresponding to the buttons 125A-125C.

FIG. 4D illustrates a user interaction 420 that generates a second set of input signals for a second set of confirmation devices (e.g., the button 125E). That is, the associate presses the button 125E which illuminates the lights above the button 125E in the same color as the lights above the button 125D. The user interaction 420 may also include a special action to indicate the associate has reached an end of the storage area 405B; however, because the button 125E is the last button in the shelf 400, the I/O controller may automatically determine the associate has reached the end of the storage area 405B.

The light controller can assign the illuminated lights above the buttons 125D and 125E to the storage area 405B, thereby visually defining the length of the area 405B. Thus, when illuminated, the lights above the buttons 125D and 125E can visually indicate to an associate that she should perform an action in the storage area 405B. However, when the lights above the buttons 125A-125C are illuminated, this indicates to the associate she should perform an action in the storage area 405A. In this manner, using the method 300, the lights in the light strip 120 and the buttons 125 in the adjustable shelf 400 can be reprogrammed as the size of the storage areas 405 vary.

In one embodiment, after configuring one shelf, the associate may replicate this configuration for all the remaining shelves. For example, if the shelf 400 is the top shelf in a shelving system where all the shelves have the same configuration, after programming the lights and buttons as shown in FIGS. 4A-4D, the associate can use the touch enabled display screen to instruct the I/O controller to assign the same configuration for the remaining shelves in the system.

Figure 5A:
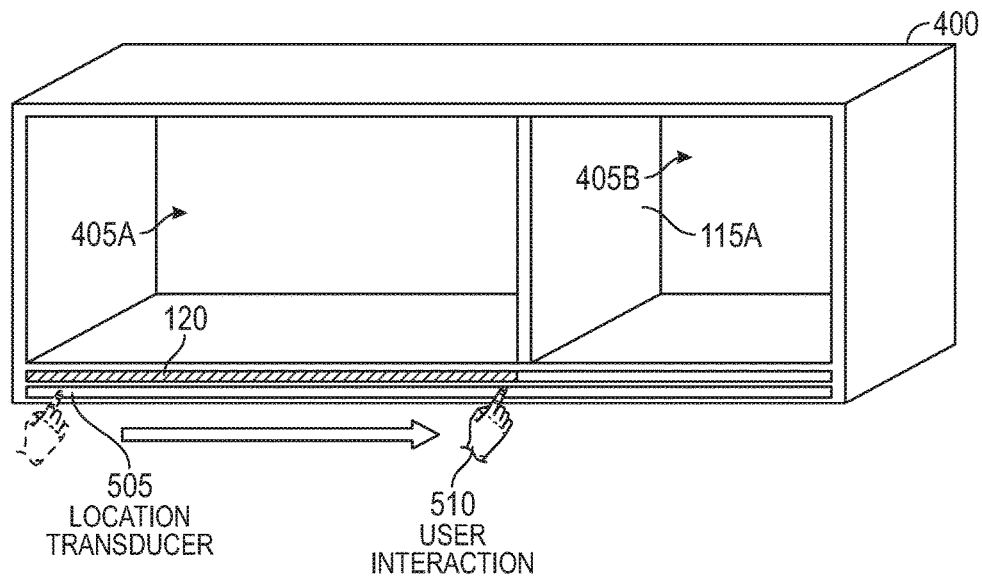
FIGS. 5A and 5B illustrate reconfiguring a lighting system for an adjustable shelf, according to various embodiments.
Figure 5B:
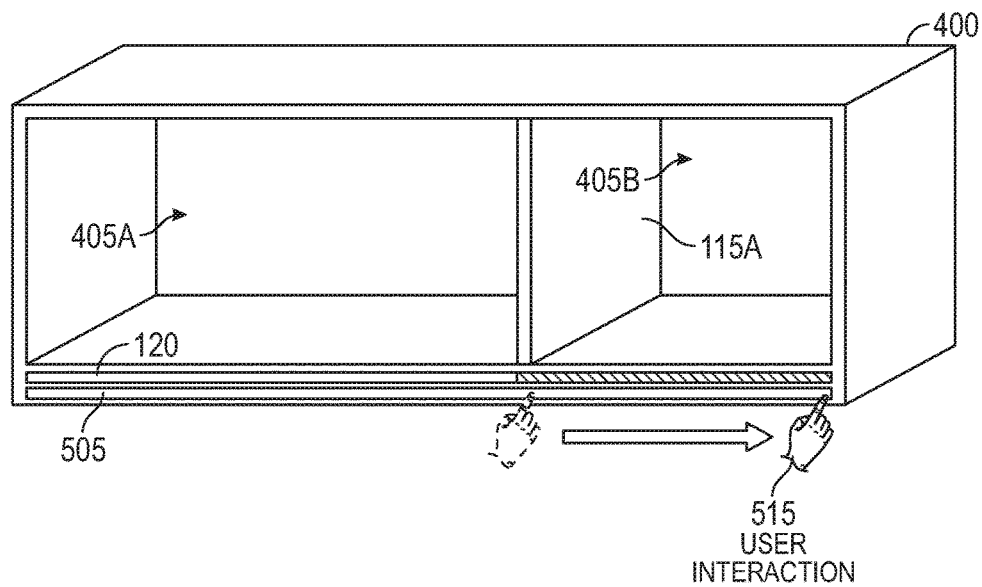

FIGS. 5A and 5B illustrate reconfiguring a lighting system for an adjustable shelf, according to various embodiments. Specifically, FIGS. 5A and 5B illustrate using the method 300 to reprogram the lights in the light strip 120 using a different confirmation device than the buttons illustrated in FIGS. 4A-4D. FIG. 5A illustrates an adjustable shelf 400 that includes a location transducer 505 for detecting a user interaction. Instead of a plurality of buttons, the location transducer 505 can provide a continuous interactive button that determines a location of the finger of the associate along its length which extends underneath the entire length of the shelf 400. As shown in FIG. 5A, the associate can drag her finger from the left side of the transducer 505 (which may be capacitive or pressure activated) to a location of the moveable divider 115A. As the associate slides her finger, the lights above the portions of the transducer 505 that have been touched by the associate are illuminated as indicated by the hashing. The associate sliding her finger along the transducer 505 can generate a first set of input signals as recited in block 310. The light controller can use a mapping between the locations along the transducer 505 and lights in the light strip 120 to determine which lights to illuminate. Put differently, different locations along the transducer 505 are uniquely assigned to at least one of the series of lights in the strip 120. For example, by sliding her finger back and forth along the transducer 505, the associate can illuminate the lights in the strip 120 that correspond to the size of the storage area 405A. In one embodiment, lifting her finger off the transducer indicates to the button controller that the associate has reached an end of the storage area 405A and that the currently illuminated lights in the strip 120 should be assigned to the storage area 405A.

In another embodiment, the associate may touch a first location of the transducer 505 at the leftmost end of the storage area 405A (e.g., the location of the ghosted hand in FIG. 5A) and then touch a second location of the transducer 505 at the rightmost end of the storage area 405B (e.g., the location of the solid hand in FIG. 5A). Doing so indicates to the I/O controller the beginning and end points of the storage area 405A along the axes defined by the light strip 120 and the location transducer 505. The light controller can then assign the lights in the strip 120 that are between these two points to the storage area 405A.

FIG. 5B illustrates a user interaction 515 with the transducer 505 to define the length of the second storage area 405B. As indicated by the ghosted hand, the associate first touches a location of the transducer 505 that is at or just to the right of the divider 115A. By dragging her finger along the transducer 505 until reaching the end of the storage area 405B (e.g., the right side of the shelf 400), the associate can indicate the length of the storage area 405B to the I/O controller. As shown by the hashing, as the associate drags her finger along the transducer 505, the light controller can illuminate the lights over the portion of the transducer 505 she has touched. Once the associate lifts her finger off the transducer 505, the light controller can assign the lights in the strip 120 that correspond to the touched portion of the transducer 505 to the storage area 405B. In this manner, a first set of input signals (e.g., the user interaction 510 in FIG. 5A) and a second set of input signals (e.g., the user interaction 515 in FIG. 5B) can be used to identify first and second subsets of the lights in the strip 120 to define the length or size of the storage areas 405A and 405B.

Figure 6A:
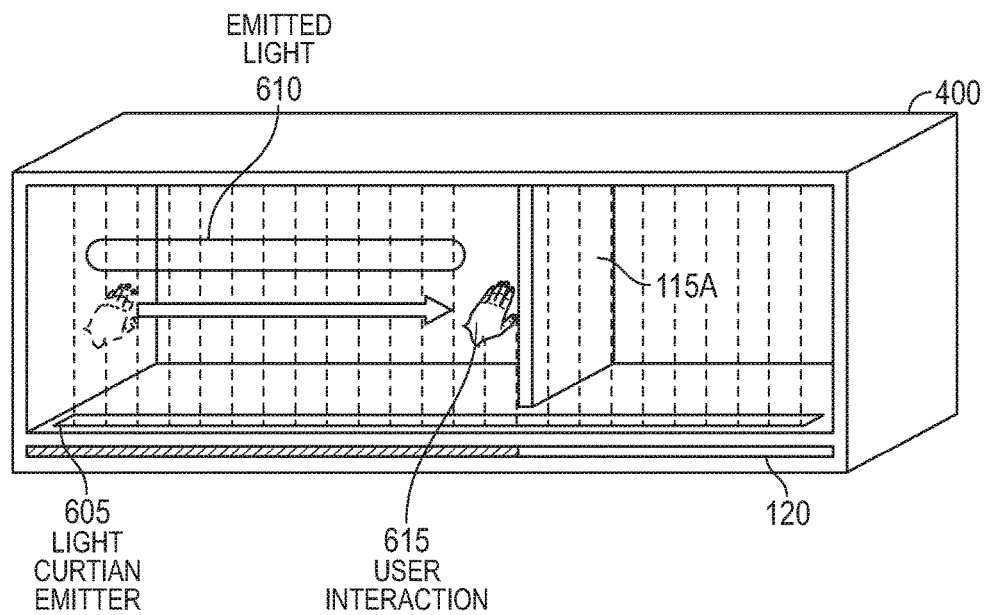
FIGS. 6A and 6B illustrate reconfiguring a lighting system for an adjustable shelf, according to various embodiments.
Figure 6B:
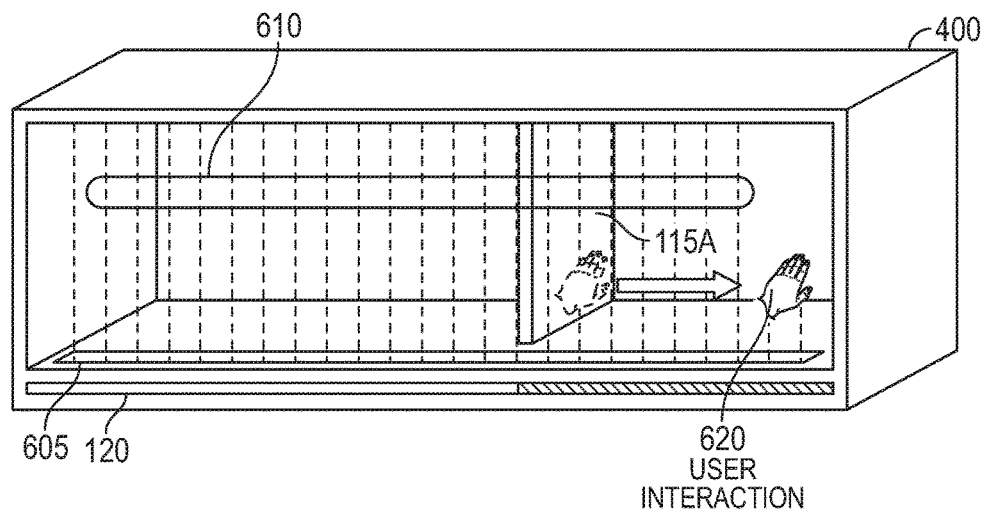

FIGS. 6A and 6B illustrate reconfiguring a lighting system for an adjustable shelf 400, according to various embodiments. Specifically, FIGS. 6A and 6B illustrate using the method 300 to reprogram the lights in the light strip 120 using a different confirmation device. In this example, the adjustable shelf 400 includes a light curtain emitter 605 which is a confirmation device for detecting user actions. The light curtain emitter 605 is disposed along the bottom of the storage areas 405A and 405B and emits light up towards a top of the shelf 400. Although not shown, the top of the shelf 400 can include one or more light detectors for detecting the light 610 emitted by the light curtain emitter 605. When the associate places a hand between the light curtain emitter 605 and the detectors thereby blocking the emitted light 610, this indicates a location of the hand in the shelf 400.

When programming the size of the storage areas 405, the I/O controller activates the light curtain emitter 605 such that it emits light up towards the detectors on the top surface of the storage areas 405A and 405B. As shown by the ghosted hand, the associate initially places her hand between the emitter 605 and the detectors at a location at the left side of the shelf 400. This indicates to the I/O controller the left side of the storage area 405A. As shown by the arrow and the user interaction 615, the associate moves her hand from the left side of the shelf 400 to the divider 115A. Moving her hand blocks the emitted light 610 at different locations along the length of the shelf 400 which is detected by the light detector. In response, the light controller can illuminate the lights in the strip 120 corresponding to the locations the associate's hand has traveled through the emitted light 610 as shown by the hashing. Further, if the associate moves her hand beyond the divider 115A (e.g., to the right of the divider 115A) such that lights are illuminated that should be assigned to the storage area 405B, the associate can correct this mistake by moving her hand back to the left which instructs the light controller to turn off the lights in the strip 120 that are to the right of the current location of her hand.

In one embodiment, the associate can instruct the I/O controller she has reached the end of the storage area 405B by removing her hand from the emitted light 610. Put differently, the associate can continue to select which lights are illuminated in the strip 120 by moving her hand through the emitted light 610 until she removes her hand which then indicates to the I/O controller the currently illuminated lights in the strip 120 define the size or length of the storage area 405A. In response, the light controller can assign these lights to the storage area 405A.

FIG. 6B illustrates a user interaction 620 for defining the size or length of the storage area 405B. Here, the associate initially sticks her hand into the emitted light 610 at a location at or just to the right of the divider 115A as shown by the ghosted hand. This indicates to the I/O controller the left end of the storage area 405B. As the associate moves her hand to the right as shown by the arrow, the I/O controller illuminates the corresponding lights in the light strip 120 as illustrated by the hashing. Eventually the associate reaches the right side of the shelf 400 which defines the right end of the storage area 405B. Removing her hand indicates to the I/O controller she has reached the right end of the storage area 405B and that the currently illuminated lights in the light strip 120 should be assigned to the storage area 405B. Of course, if the associate makes a mistake (e.g., removes her hand from the curtain before reaching the right end of the storage area 405A or 405B), she can use the touch enabled display screen to cancel the last action which permits the associate to repeat the action. In this manner, a first set of input signals (e.g., the user interaction 615 in FIG. 6A) and a second set of input signals (e.g., the user interaction 620 in FIG. 5B) can identify first and second subsets of the lights in the strip 120 to define the length or size of the storage areas 405A and 405B.

In another embodiment, because the I/O controller knows the right end of the storage area 405A, it can assume that the lights in the strip 120 immediately to the right are the left end of the neighboring storage area—i.e., the left end of the storage area 405B. Thus, to define the storage area 405B, the associate may not need to initially insert her hand at the location of the ghosted hand in FIG. 6B (or touch the transducer 505 as shown in FIG. 5B) but instead simply insert her hand at the right end of the storage area 405B (or touch the portion of the transducer 505 at the right end of the storage area 405B). This informs the I/O controller the right end of the storage area 405B which can then illuminate the lights between the left and right ends of the storage area 405B as shown by the hashing.

Figure 7A:
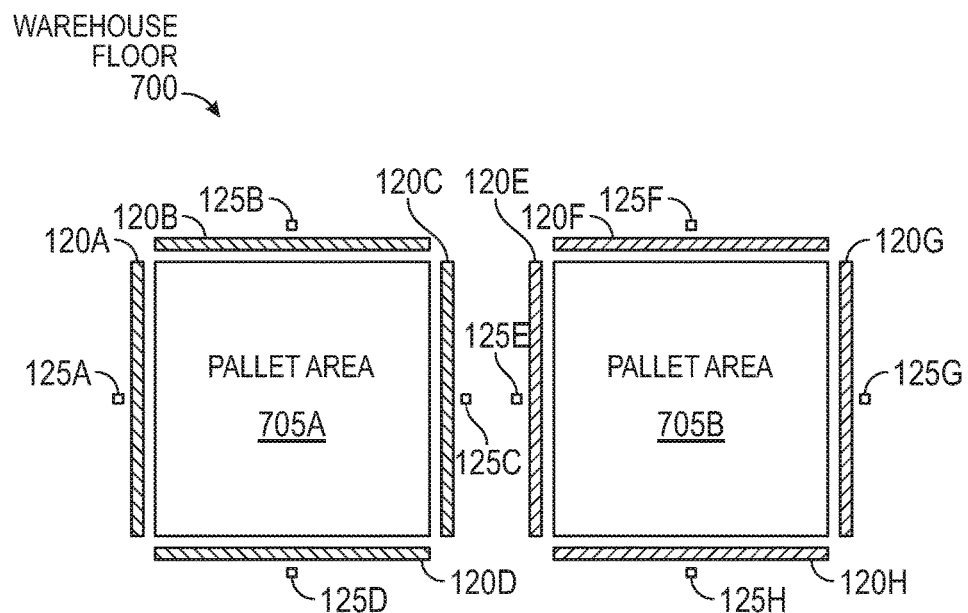
FIGS. 7A and 7B illustrate reconfiguring a lighting system for pallet storage areas, according to various embodiments.
Figure 7B:
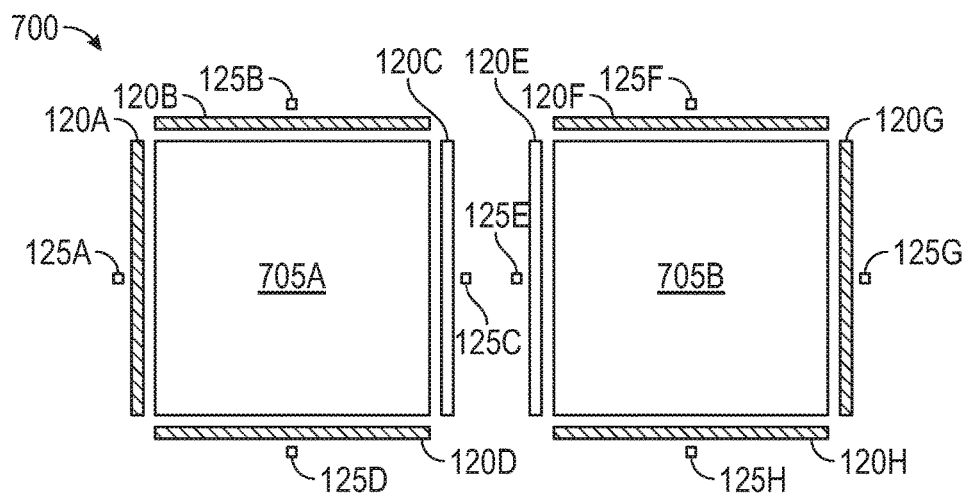

FIGS. 7A and 7B illustrate reconfiguring a lighting system for pallet storage areas 705, according to various embodiments. Specifically, FIGS. 7A and 7B illustrate a top down view of a warehouse floor 700 which is divided into two pallet areas 705A and 705B. In one embodiment, instead of using permanent markings (e.g., tape or paint applied to the floor 700) to indicate the boundaries of the pallet areas 705A and 705B, a plurality of light strips 120 can be disposed at the boundaries. In one embodiment, the light strips 120 may be embedded into the floor 700 to reduce their profile so that associates and machines (e.g., pallet movers) can easily store and retrieve pallets or packages from the pallet areas 705.

In addition to the light strips 120, buttons 125 can be disposed around the periphery of the pallet areas 705 which the associates can use both when programming the size of the pallet areas and when indicating an item has be stored in, or removed from, the pallet areas 705. In one embodiment, the buttons 125 are recessed into the floor 700 such that an associate can step on the buttons. In another example, the buttons 125 may be mounted on a stand near the waist of the associate. Moreover, although buttons 125 are shown, other confirmation devices can be used such as a light curtain that indicates when a user has passed over one of the light strips 120 and entered or left a pallet area 705.

FIG. 7A illustrates an initial assignment of the light strips 120 to the pallet areas 705. In this example, the pallet areas 705 are considered as two different pallet areas 705. For example, the pallet area 705A may be assigned to store packages for a first destination while the pallet area 705B is assigned to store package for a second, different destination. To indicate the pallet areas 705 are different storage areas, when an associate wants to retrieve an item from the pallet area 705A, the inventory tracking system can instruct the light controller to illuminate the light strips that surround only the pallet area 705A—i.e., the light strips 120A-120D. The light strips surrounding the pallet area 705B—i.e., the light strips 120E-120H—are unilluminated (or at least illuminated using a different color as shown by the different hashing). The associate can easily determine the boundary of the pallet area 705A and retrieve the packages or pallet.

However, one pallet area 705 may not be sufficient for holding all the packages or pallets. That is, like the adjustable shelf examples discussed above, the warehouse may need to store larger items, or too many items than can fit into one pallet area (or one storage area). As such, the associate may combine the pallet areas 705 into one combined area. To do so, the associate uses the touch enabled display device to inform the I/O controller she wishes to reprogram the light strips 120 and the buttons 125.

To combine the pallet areas, the associate can press the buttons 125 that define the boundary of the new pallet area. In this example, the associate can press the buttons 125A, 125B, 125D, 125F, 125G, and 125H. As she presses these buttons 125, the light controller can illuminate the lights strips corresponding to these buttons—i.e., the strips 120A, 120B, 120D, 120F, 120G, and 120H. Notably, the buttons 125C and 125E are not pressed which means the light strips 10C and 120E are not illuminated.

FIG. 6B illustrates the combined pallet area that includes the pallet areas 705A and 705B as defined by the illuminate light strips 120A, 120B, 120D, 120F, 120G, and 120H. That is, these lights strips 120 have the same hashing to indicate they are illuminated with the same color. The light controller can then assign the light strips 120A, 120B, 120D, 120F, 120G, and 120H to the combined pallet area formed by the areas 705A and 705B. Thus, whenever the associate wishes to store or retrieve an item from the combined area, the inventory tracking system instructs the light controller to illuminate the light strips 120A, 120B, 120D, 120F, 120G, and 120H in the same color thereby indicating to the associate the boundaries of the pallet area. In this manner, the method 300 can be used to retrieve a first set of input signals (using the buttons 125) to determine a subset of the light strips (e.g., the lights strips 120A, 120B, 120D, 120F, 120G, and 120H) which define a size of the pallet area.

Later, the associate can again use the method 300 to reprogram the sizes of the pallet areas so they form individual areas as shown in FIG. 7A. That is, after instructing the I/O controller the associates wants to reprogram the light strips 120, the associate can press the buttons 125A-125D (e.g., a first set of input signals) to select the light strips 120A-120D for defining the size of the first pallet area 705A. The associate may press the last button twice to indicate she is done establishing the boundary for the first pallet area 705A. The associate can then press the buttons 125E-125H (e.g., a second set of input signals) to select the light strips 120E-120H for defining the size of the second pallet area 705B. In this example, some of the light strips 120 extend on the same axis while others extend on a different axis.

Figure 8:
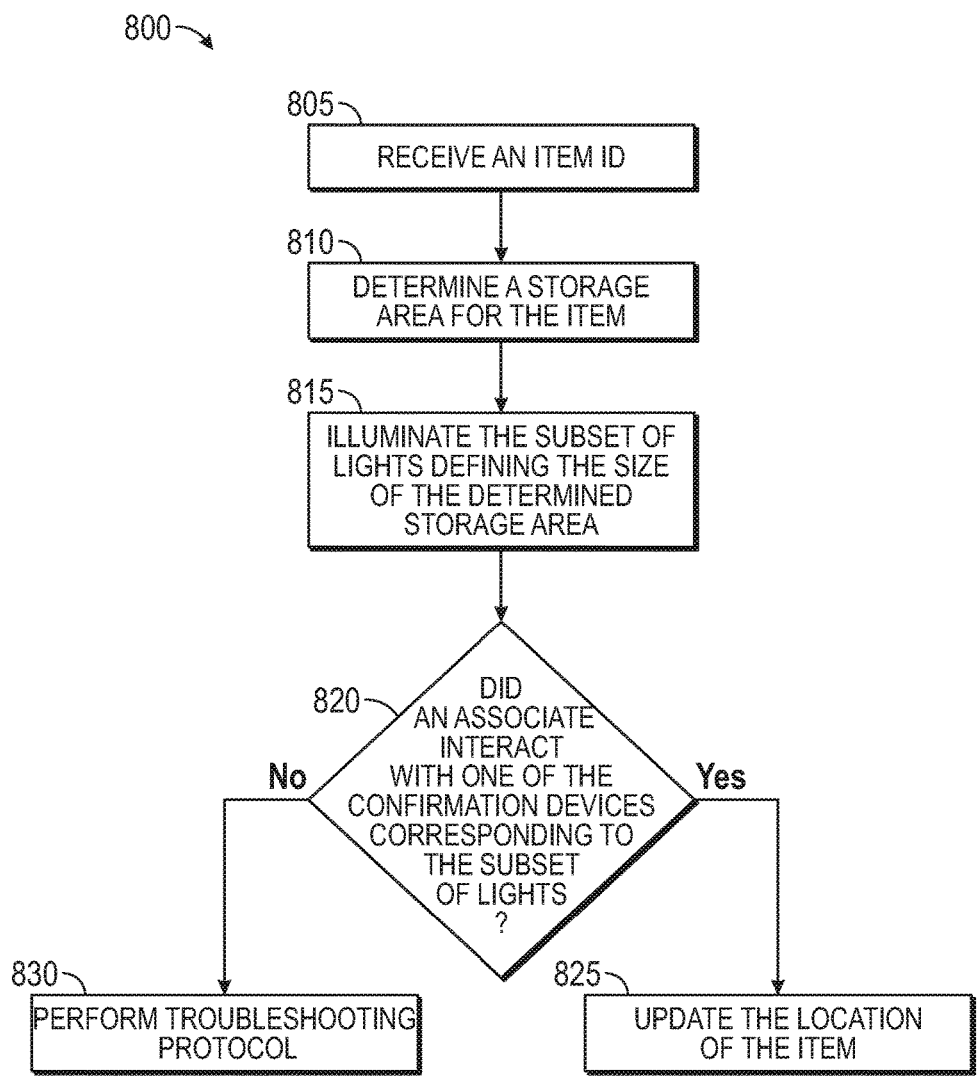
FIG. 8 is a flowchart for indicating a storage area for an item using a configurable lighting system, according to various embodiments.

FIG. 8 is a flowchart of a method 800 for indicating a storage area for an item using a configurable lighting system, according to various embodiments. That is, the method 800 may be performed after the method 300 is performed to program the lights and assign them to storage areas. At block 805, the inventory tracking system receives an item ID. For example, the associate may scan a barcode on a package that the inventory tracking system uses to identify the ID for the package. In another example, the associate may have a shipping list (or pick list) which she uses to retrieve packages for building a pallet or filling a box for a customer order. The associate may scan a bar code on the pick list to identify the next package or item she should pick from a storage area.

At block 810, the inventory tracking system determines a storage area for the item. If the associate is stowing an item, the inventory tracking system uses the ID to determine the appropriate destination storage area for the item. If the associate is picking an item, the inventory tracking system can identify the storage area which currently stores that item.

At block 815, the light controller illuminates the subset of lights defining the size of the determined storage area. In one embodiment, the inventory tracking system provides an ID or name of the determined storage area to the light controller. As discussed above, the light controller can use the method 300 to assign lights in a light strip to a particular storage area. Thus, using the ID of the determined storage area, the light controller can use a mapping to identify and illuminate the subset of lights corresponding to that storage area.

At block 820, the button controller determines whether an associate interacted with one of the confirmation devices corresponding to the subset of lights. That is, the button controller (or the light controller) can map the confirmation devices to one or more of the lights (or to the storage areas). Put differently, each confirmation device may be assigned to one or more of the lights based on, for example, proximity between the lights and the confirmation device. Thus, at block 820, the button controller can determine whether the associate interacted with a confirmation device that is assigned to one of the illuminated lights.

If so, the method 800 proceeds to block 825 where the inventory tracking system updates the location of the item. For example, assuming the associate stowed an item in the storage area, the I/O controller can inform the inventory tracking system that the item was stowed once the associate interacts with one of the confirmation devices assigned to the lights defining the size of the storage area. In turn, the inventory tracking system updates the location of the item to the location of the storage area. In another example, if the associate retrieved an item from the storage area, the I/O controller can inform the inventory tracking system that an item was taken from the area once the associate interacts with one of the confirmation devices. The inventory tracking system can then update the location of the item as being in transient, or that the item is no longer in the storage area.

However, if the associate interacts with a confirmation device not assigned to the illuminated lights or the determined storage area, the method 800 proceeds to block 830 where the inventory tracking system performs a troubleshooting protocol. For example, despite the illuminated lights, the associate may have placed the package in the wrong storage area. The inventory tracking system may provide feedback to the associate using an I/O device (e.g., a speaker, a display screen, or an electronic device worn by the user) for correcting the mistake. In another example, the inventory tracking system may instruct the I/O controller to change the color of the illuminated lights to red which indicates to the associate she performed an incorrect action.

Figure 9A:
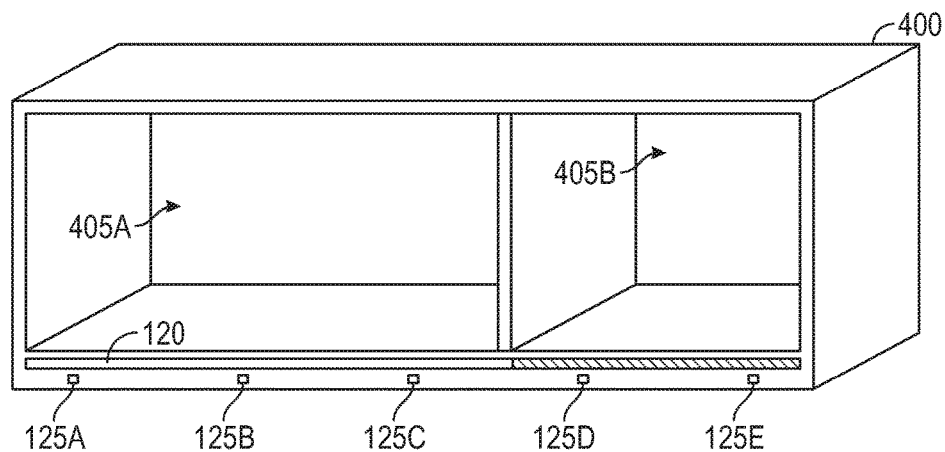
FIGS. 9A and 9B illustrate placing an item in a storage area using a configurable lighting system, according to various embodiments.
Figure 9B:
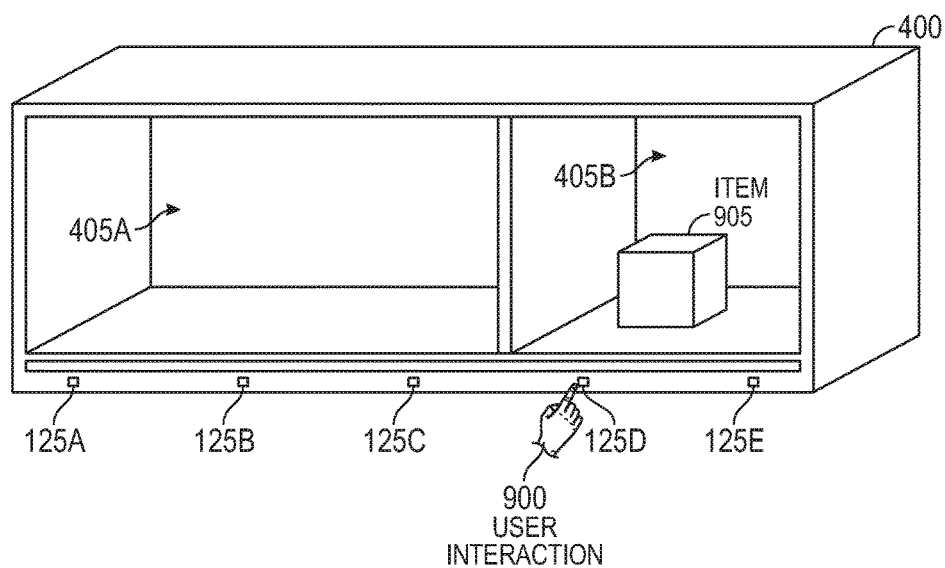

FIGS. 9A and 9B illustrate placing an item in a storage area using a configurable lighting system, according to various embodiments. FIGS. 9A and 9B illustrate one example of using lights and confirmation devices programmed using the method 300 to perform the operations described in the method 800. In FIG. 9A, the adjustable shelf 400 uses the divider 115A to form the storage areas 405A and 405B. In this example, the associate wants to store an item, but does not know the appropriate storage area 405. To learn the location where she should stow the item, the associate may scan a bar code on the item which the inventory tracking system uses to identify the appropriate storage area. For example, the inventory tracking system may want the associate to store a first type of item in the storage area 405A and a second type of item in the storage area 405B. Or the inventory tracking system may sort the items based on a shipping destination where the storage areas 405 are assigned different zip codes.

In FIG. 9A, the inventory tracking system determines that the item should be stowed in the storage area 405B, and as a result, instructs the light controller to illuminate the lights in the light strip 120 that are assigned to the storage area 405B. As shown by the hashing, the light controller illuminates the lights in the portion of the strip 120 below the storage area 405B.

FIG. 9B illustrates that the associate has placed an item 905 in the storage area 405B and then performed a user interaction 900 with the button 125D. For example, the associate may press the button 125D after stowing the item 905. Because the button 125D corresponds to the lights assigned to the storage area 405B, the I/O controller may indicate the associate has correctly stowed the item 905 by turning off the lights. However, in another example, the I/O controller may change the color of the lights to indicate whether the stow was performed correctly (e.g., changing the lights to green) or incorrectly (e.g., changing the lights to red).

Although the associate interacted with the button 125D, the associate may also have pressed the button 125E. That is, the associate can interact with any button 125 corresponding to the illuminated lights in order to indicate the stow was complete. Further, as explained above, although buttons 125 are shown, the adjustable shelf 400 can include any confirmation device that can be used both to reprogram the lights as well as detect when a user has stowed or picked an item.

The process is reversed when picking the item from the storage area 405B. For example, the associate can scan a pick list, which may include a plurality of items, to identify the items she should retrieve. If the item 905 is on that list, the inventory tracking system instructs the light controller to illuminate the portion of the strip 120 shown in FIG. 9A thereby indicating the associate that she should retrieve the item 905. The associate can then press either the button 125D or 125E to inform the inventory tracking system that she has retrieved the item 905.

In one embodiment, the lights assigned to the first storage area 405A in the strip 120 (e.g., the lights above the buttons 125A-125C) may be illuminated at the same time as the lights assigned to the second storage area 405B (e.g., the lights above the buttons 125D and 125E). For example, a first associate may be retrieving the item 905 from the second storage area 405B while a second associate is stowing an item in the first storage area 405B. In this example, the light controller may illuminate the lights using different colors. For example, each associate, or each task, may be assigned a unique color.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system comprising:
   a series of lights disposed along a first axis;
   a series of buttons spaced along a second axis parallel to the first axis, wherein each of the series of buttons corresponds to a respective subset of the series of lights; and
   a control system configured to:
      receive a first set of input signals from a first set of the series of buttons,
      identify a first subset of the series of lights corresponding to the first set of the series of buttons, wherein the first subset of the series of lights defines a size of a first storage area when illuminated,
      receive a second set of input signals from a second set of the series of buttons,
      identify a second subset of the series of lights corresponding to the second set of the series of buttons, wherein the second subset of the series of lights defines a size of a second storage area when illuminated, wherein the first subset of the series of lights comprise a different number of lights than the second subset of the series of lights,
      receive an identification (ID) corresponding to an item,
      select one of the first and second storage areas based on the ID,
      illuminate one of the first and second subset of the series of lights corresponding to the selected storage area,
      determine a user action corresponding to the item was completed based on receiving a third set of input signals from at least one of the series of buttons corresponding to the illuminated lights, and
      updating a location of the item.

2. The system of claim 1, further comprising:
   an adjustable shelf comprising the series of lights, the series of buttons, and a moveable divider, wherein the moveable divider divides the first and second storage areas.

3. The system of claim 2, wherein the series of lights is disposed within a light strip that extends along the adjustable shelf.

4. The system of claim 1, wherein the first set of input signals comprises input signals generated as a user activates the first set of the series of buttons sequentially along the second axis.

5. The system of claim 4, wherein the control system is configured to:
   identify that the user has reached an end of the first storage area when the user presses one button in the first set of the series of buttons twice.

6. The system of claim 1, wherein the control system is configured to:
   receive an instruction to reprogram the series of lights in response to a change in sizes of the first and second storage areas;
   receive a fourth set of input signals from a third set of the series of buttons;
   identify a third subset of the series of lights corresponding to the third set of the series of buttons, wherein the third subset of the series of lights defines the size of the first storage area when illuminated;
   receive a fifth set of input signals from a fourth set of the series of buttons; and
   identify a fourth subset of the series of lights corresponding to the fourth set of the series of buttons, wherein the fourth subset of the series of lights defines the size of the second storage area when illuminated, wherein the third subset of the series of lights comprise a different number of lights than the fourth subset of the series of lights.

7. A system comprising:
   a series of lights disposed along a first axis;
   a set of confirmation devices corresponding to the series of lights; and
   a control system configured to:
      receive a first input signal from the set of confirmation devices,
      identify a first subset of the series of lights corresponding to the first input signal, wherein the first subset of the series of lights corresponds to a length of a first storage area when illuminated,
      receive a second input signal from the set of confirmation devices,
      identify a second subset of the series of lights corresponding to the second input signal, wherein the second subset of the series of lights defines a length of a second storage area when illuminated, wherein the first subset of the series of lights is different from the second subset of the series of lights,
      illuminate one of the first and second subsets of the series of lights to indicate a user action corresponding to one of the first and second storage areas, and
      determine the user action was completed based on receiving a third input signal from the set of confirmation devices.

8. The system of claim 7, wherein the set of confirmation devices comprises a plurality of discrete confirmation devices, wherein each of the plurality of discrete confirmation devices is assigned to a unique set of the series of lights.

9. The system of claim 8, wherein the plurality of discrete confirmation devices extends along a second axis parallel to the first axis.

10. The system of claim 7, wherein the set of confirmation devices comprises a single confirmation device, wherein different locations along the single confirmation device are uniquely assigned to at least one of the series of lights.

11. The system of claim 10, wherein the single confirmation device extends longitudinally along a second axis parallel to the first axis.

12. The system of claim 7, wherein determining the user action was completed based on receiving the third input signal from the set of confirmation devices comprises:
  determining whether the third input signal is received for a location or a confirmation device in the set of confirmation devices that corresponds to the illuminated lights, wherein the user action is one of picking an item from one of the first and second storage areas and stowing the item in one of the first and second storage areas.

13. The system of claim 7, further comprising:
  an adjustable shelf comprising the series of lights, the set of confirmation devices, and a moveable divider, wherein the moveable divider divides the first and second storage areas.

14. The system of claim 7, wherein the first and second storage areas are pallet storage areas on a floor of a warehouse, wherein the series of lights extends along respective sides of the pallet storage areas.

15. The system of claim 7, further comprising:
  an inventory tracking system configured to update a location of an item in response to determining the user action was completed.

16. A method, comprising:
  receiving a first input signal from a set of confirmation devices corresponding to a series of lights, wherein the series of lights is disposed along a first axis;
  identifying a first subset of the series of lights corresponding to the first input signal, wherein the first subset of the series of lights corresponds to a length of a first storage area when illuminated;
  receiving a second input signal from the set of confirmation devices;
  identifying a second subset of the series of lights corresponding to the second input signal, wherein the second subset of the series of lights defines a length of a second storage area when illuminated, wherein the first subset of the series of lights is different from the second subset of the series of lights;
  illuminating one of the first and second subsets of the series of lights to indicate a user action corresponding to one of the first and second storage areas; and
  determining the user action was completed based on receiving a third input signal from the set of confirmation devices.

17. The method of claim 16, wherein the set of confirmation devices comprises a plurality of discrete confirmation devices, wherein each of the plurality of discrete confirmation devices is assigned to a unique set of the series of lights.

18. The method of claim 17, wherein the plurality of discrete confirmation devices extends along a second axis parallel to the first axis.

19. The method of claim 16, wherein the set of confirmation devices comprises a single confirmation device, wherein different locations along the single confirmation device are uniquely assigned to at least one of the series of lights.

20. The method of claim 16, further comprising:
  updating a location of an item in response to determining the user action was completed.

* * * * *